United States Patent
Wang et al.

(10) Patent No.: US 6,758,789 B1
(45) Date of Patent: Jul. 6, 2004

(54) RESTORING DEVICE OF A SKATEBOARD-LIKE EXERCISER

(76) Inventors: Leao Wang, No. 1, Lane 233, Sec. 2, Charng Long Rd., Taiping (TW), 411; Peter Wu, No. 1, Lane 233, Sec. 2, Charng Long Rd., Taiping (TW), 411

(*) Notice: Subject to any disclaimer, the term of this patent is extended or adjusted under 35 U.S.C. 154(b) by 0 days.

(21) Appl. No.: 09/660,294

(22) Filed: Sep. 13, 2000

(51) Int. Cl.$^7$ ................................................. B62M 1/00
(52) U.S. Cl. ..................................... 482/51; 280/87.042
(58) Field of Search ........................ 482/51; 280/87.01, 280/87.021, 87.03, 87.041, 87.042

(56) References Cited

U.S. PATENT DOCUMENTS

| | | | |
|---|---|---|---|
| 5,927,733 A | * 7/1999 | Banda | 280/87.041 |
| 6,279,930 B1 | * 8/2001 | Chang et al. | 280/87.042 |
| 6,367,828 B1 | * 4/2002 | Mandic | 280/87.05 |

* cited by examiner

Primary Examiner—Glenn E. Richman
(74) Attorney, Agent, or Firm—Troxell Law Office PLLC; Kuo-Hsiung Chiu

(57) ABSTRACT

The present invention relates to a front supporting rod, a front wheel assembly, a main frame, a deck and a rear wheel assembly. A plate extends at each of two sides of the front end of said main frame while two corresponding plate are disposed at two sides of the upper part of a longitudinal shaft of said front wheel assembly. Moreover, two soft resilient bodies are fixed between two sets of said plates. As a result, when the main frame is inclined to the side by steering the front supporting bar for creating a direction-turning effect to the front wheels, two plates at two sides of the main frame will squeeze or pull the resilient body respectively. After removal of the external force, the main frame, the front supporting bar and the front wheels restore themselves by the resilience of the resilient body.

2 Claims, 3 Drawing Sheets

RESTORING DEVICE OF A SKATEBOARD-LIKE EXERCISER

BACKGROUND OF THE INVENTION

1. Field of the Invention

The present invention relates to a restoring device of a skateboard-like exerciser, and more particularly to a device that is able to exert an excellent restoring effect for a skateboard-like exerciser.

2. Description of the Prior Art

The most common steering effect of a conventional skateboard-like exerciser is achieved by turning the front supporting bar and the main-frame. Therefore, the user can easily steer the skateboard-like exerciser with only one hand. This technique is something different from the steering method of the handlebar of the bicycle. However, how to enable the front supporting bar and the main frame to rapidly and automatically restore themselves after the direction-turning is a most importance point for the manufacturer in the field of the skateboard-like exerciser.

SUMMARY OF THE INVENTION

It is a primary object of the present invention to overcome the drawbacks associated with the prior art and to provide a restoring device of a skateboard-like exerciser that is fitted with resilient bodies interposed between the main frame and the front wheel assembly for achieving the restoring effect while the production cost won't be increased too much.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
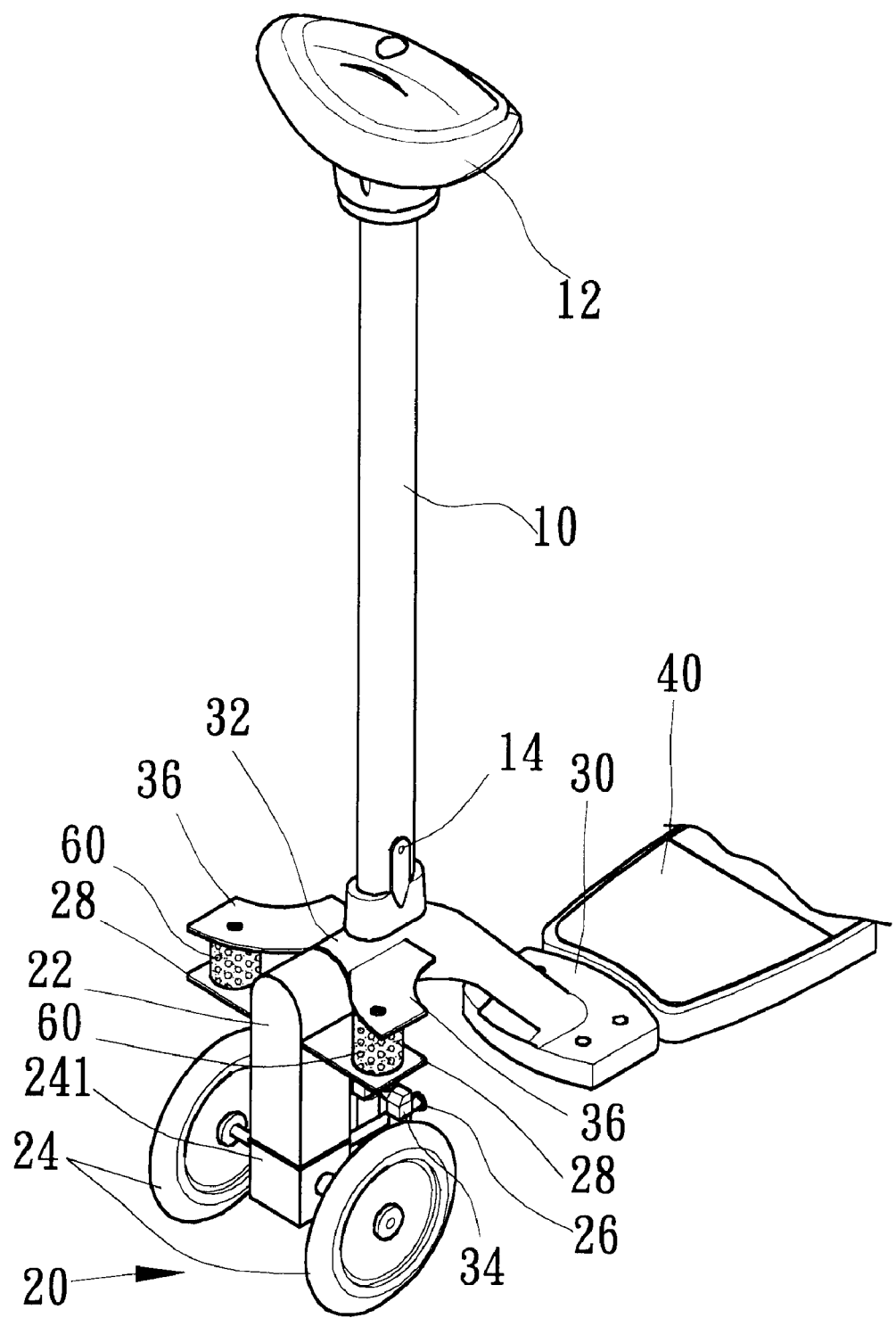
FIG. 1 is a partial perspective view of the present invention.
Figure 2:
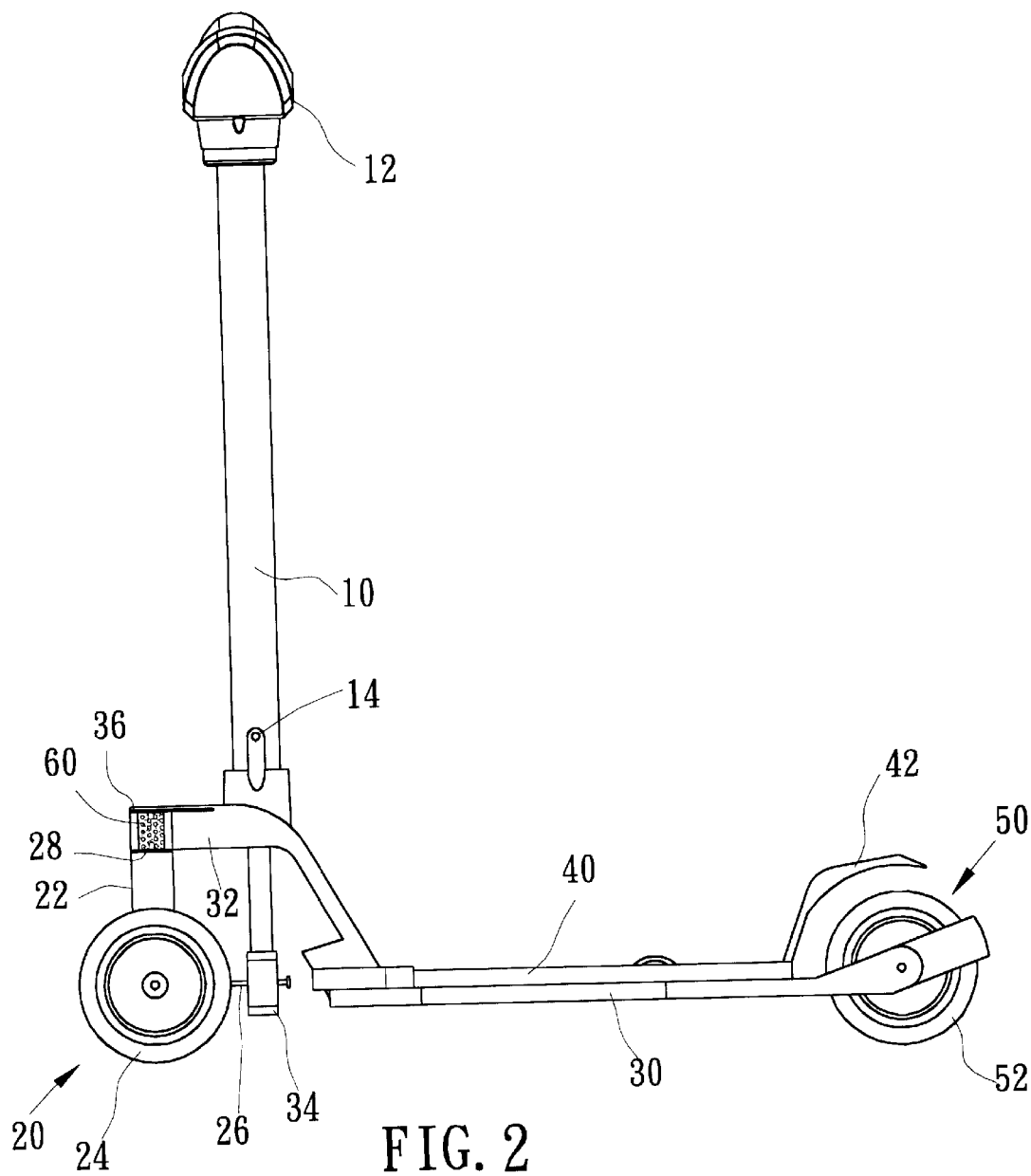
FIG. 2 is a side view of the present invention after assembly.

Referring to FIGS. 1 and 2, the skateboard-like exerciser in accordance with the present invention includes:

a front supporting rod 10 having a handgrip 12 at the top thereof, the front supporting rod 10 being pivoted with a main frame 30 by means of a first pivot 14 in order to incline the main frame 30 to the right or to the left;

a front wheel assembly 20 having a longitudinal shaft 22, two front wheels 24 and a steering unit 26, the front wheel 24 being pivoted with the longitudinal shaft 22 by means of a locating member 241;

a main frame 30 being pivoted with the front wheel assembly 20 at the front end 32 thereof, a push element 34 extending downward from the bottom of the front end 32 for receiving the steering unit 26 to achieve the direction-turning effect;

a deck 40 being pivotally mounted on the top of the main frame 30, a tail 42 at the rear end thereof being slightly raised and covering rear wheels 52, a proper clearance between the deck 40 and the rear wheels 52 being maintained; and a rear wheel assembly 50 being pivoted at the rear end of the main frame 30 and having rear wheels 54.

Figures 3, 4:
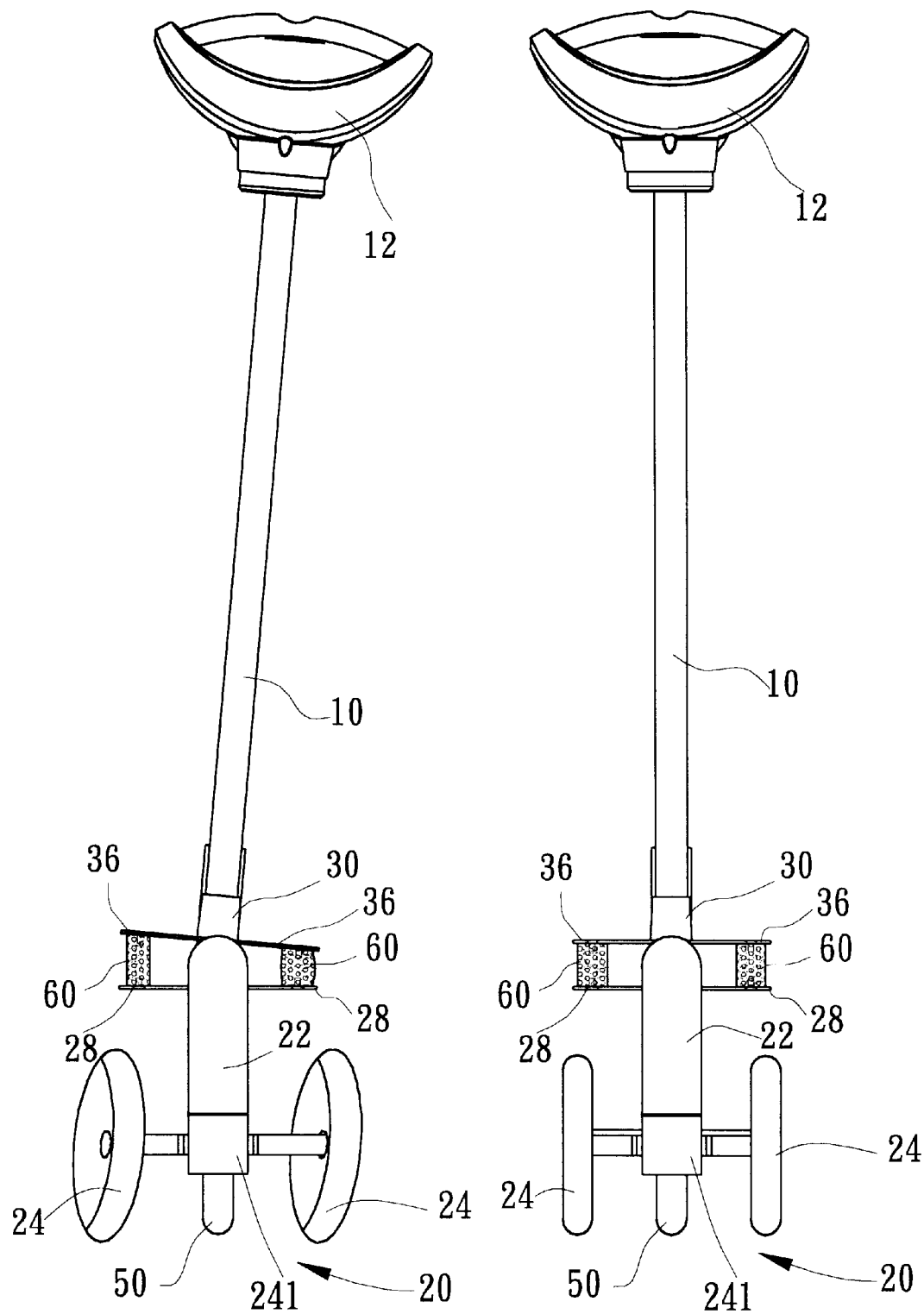
FIG. 3 is a front view of the present invention assembly.
FIG. 4 is a front view of the present invention after assembly, showing the operation thereof.

As shown in FIGS. 3 and 4, a plate 36 extends at each of two sides of the front end 32 of the main frame 30 while two corresponding plate 28 are disposed at two sides of the upper part of the longitudinal shaft 22 of the front wheel assembly 20. Thereafter, two soft resilient bodies 60 are fixed between two sets of plates 36, 28. As a result, when the main frame 30 is inclined to the side by steering the front supporting bar 10 for creating a direction-turning effect to the front wheels 24, two plates 36 at two sides of the main frame 30 will squeeze or pull the resilient body 60 respectively. After removal of the external force, the main frame 30, the front supporting bar 10 and the front wheels 24 restore themselves by means of the resilience of the resilient body 60.

The steering unit 26 is used to coordinate with the front supporting bar 10 and the push element 34 of the main frame 30 in order for the front wheel assembly to turn to the right or the left. This technique has been disclosed by the inventor of the present invention so that it won't be described more hereinafter.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claim.

What is claimed is:

1. A skateboard exerciser comprising:
   a) a main frame having: a deck; a rear wheel; and a front end;
   b) a front supporting rod extending upwardly from the front end of the main frame;
   c) a front wheel assembly comprising;
      i) a locating member having front wheels attached thereto and a steering unit extending therefrom; and,
      ii) a longitudinal shaft pivotally connected to the locating member and to the front end of the main frame so as to pivot relative to the locating member and relative to the front end;
   d) a push element mounted on the front end of the main frame and engaging the steering unit;
   e) a first plate extending outwardly from each of two opposite sides of the longitudinal shaft, each first plate having a first distal end;
   f) a second plate extending outwardly from each of two opposite sides of the front end, each second plate having a second distal end; and,
   g) a resilient body mounted between the first and second plates on each of two opposite sides of the longitudinal shaft and front end whereby pivoting of the front end relative to the longitudinal shaft causes resilient compression of one of the resilient bodies.

2. The skateboard exerciser of claim 1 wherein each resilient body is mounted adjacent to the distal ends of the associated first and second plates.

* * * * *